(12) United States Patent
Mathews

(10) Patent No.: US 8,577,354 B2
(45) Date of Patent: Nov. 5, 2013

(54) AUTOMATING ACTIONS WITHIN A PHONE NETWORK BASED UPON SCANNED WIRELESS SIGNALS

(75) Inventor: David K. Mathews, Malibu, CA (US)

(73) Assignee: NewAer, Inc., Los Angeles, CA (US)

( * ) Notice: Subject to any disclaimer, the term of this patent is extended or adjusted under 35 U.S.C. 154(b) by 0 days.

(21) Appl. No.: 13/464,442

(22) Filed: May 4, 2012

(65) Prior Publication Data

US 2013/0090106 A1    Apr. 11, 2013

Related U.S. Application Data

(60) Provisional application No. 61/544,370, filed on Oct. 7, 2011.

(51) Int. Cl.
*H04M 3/00* (2006.01)

(52) U.S. Cl.
USPC ......... 455/418; 455/443; 455/507; 455/456.1

(58) Field of Classification Search
USPC ................ 455/418, 443, 507, 456.1
See application file for complete search history.

(56) References Cited

U.S. PATENT DOCUMENTS

| | | | |
|---|---|---|---|
| 2008/0022115 A1* | 1/2008 | Mock et al. | 713/178 |
| 2010/0240343 A1* | 9/2010 | Russell | 455/411 |
| 2011/0269479 A1* | 11/2011 | Ledlie | 455/456.1 |
| 2011/0306354 A1* | 12/2011 | Ledlie et al. | 455/456.1 |
| 2012/0033658 A1* | 2/2012 | Ganesan | 370/338 |
| 2012/0072106 A1* | 3/2012 | Han et al. | 701/410 |
| 2012/0134282 A1* | 5/2012 | Tirronen et al. | 370/252 |
| 2012/0146761 A1* | 6/2012 | de Clerq et al. | 340/4.3 |
| 2012/0172027 A1* | 7/2012 | Partheesh et al. | 455/420 |

* cited by examiner

*Primary Examiner* — Barry Taylor
(74) *Attorney, Agent, or Firm* — Howison & Arnott, L.L.P.

(57) ABSTRACT

A method for automating actions within a network includes receiving at least one wireless signal from at least one wireless network device; determining identifying information associated with the at least one wireless signal; determining a scanned wireless fingerprint associated based upon the identifying information; matching the scanned wireless fingerprint to a stored wireless fingerprint; and initiating an action in response to matching of the scanned wireless fingerprint to the stored wireless fingerprint.

14 Claims, 9 Drawing Sheets

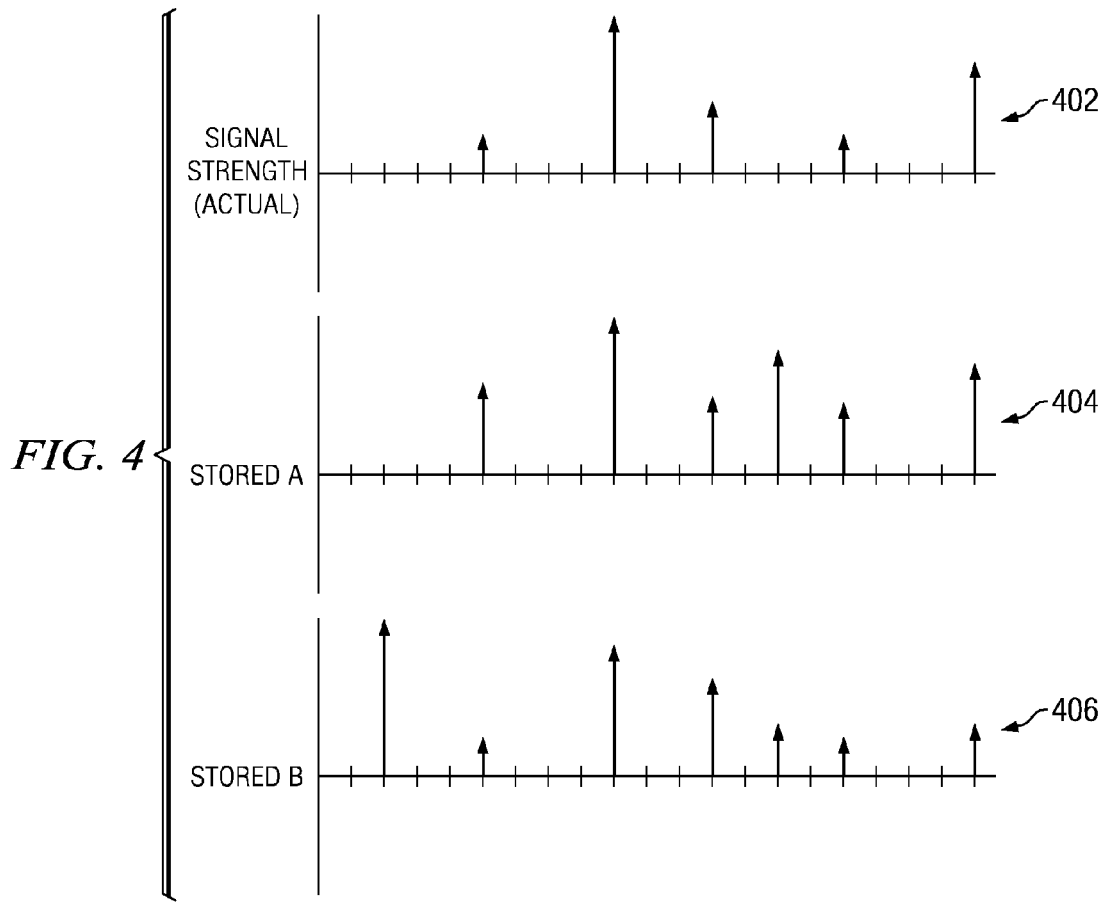

AUTOMATING ACTIONS WITHIN A PHONE NETWORK BASED UPON SCANNED WIRELESS SIGNALS

CROSS-REFERENCE TO RELATED APPLICATIONS

This application claims benefit of U.S. Provisional Application No. 61/544,370, filed Oct. 7, 2011, entitled AUTOMATING ACTIONS WITHIN A PHONE NETWORK BASED UPON SCANNED WIRELESS SIGNALS, the specification of which is incorporated herein in its entirety.

TECHNICAL FIELD

The following disclosure relates to use of wireless handheld devices and surrounding wireless devices to take certain actions.

BACKGROUND

Systems exist for allowing the routing of a user's telephone calls or initiating of actions based upon time of day. For example, a user can be provided a set of rules such as "route calls to my office from 8 am-5 pm, route calls to my mobile phone from 5 pm-7 pm, route calls to my home phone from 7 pm-10 pm, and turn off my ringer at 10 pm." In addition, systems exist for fixed location based actions in which the location of a mobile telephone is determined by GPS location. For "geofencing" a user could use a computer with a web browser to create a virtualized static "ring" or "box" around an area using a mouse and set up alarms for mobile telephones leaving that area. These areas could be a home, school, or other area that a parent deems safe.

SUMMARY

In one aspect thereof, a method for automating actions within a network includes receiving at least one wireless signal from at least one wireless network device; determining identifying information associated with the at least one wireless signal; determining a scanned wireless fingerprint associated based upon the identifying information; matching the scanned wireless fingerprint to a stored wireless fingerprint; and initiating an action in response to matching of the scanned wireless fingerprint to the stored wireless fingerprint.

BRIEF DESCRIPTION OF THE DRAWINGS

For a more complete understanding, reference is now made to the following description taken in conjunction with the accompanying Drawings in which:

FIG. 4 illustrates an example of an actual measured signal strength of wireless network signals by the mobile unit and two stored wireless fingerprints;

FIG. 5 illustrates an embodiment of a database within the server for storing wireless fingerprints;

DETAILED DESCRIPTION

Figure 1:
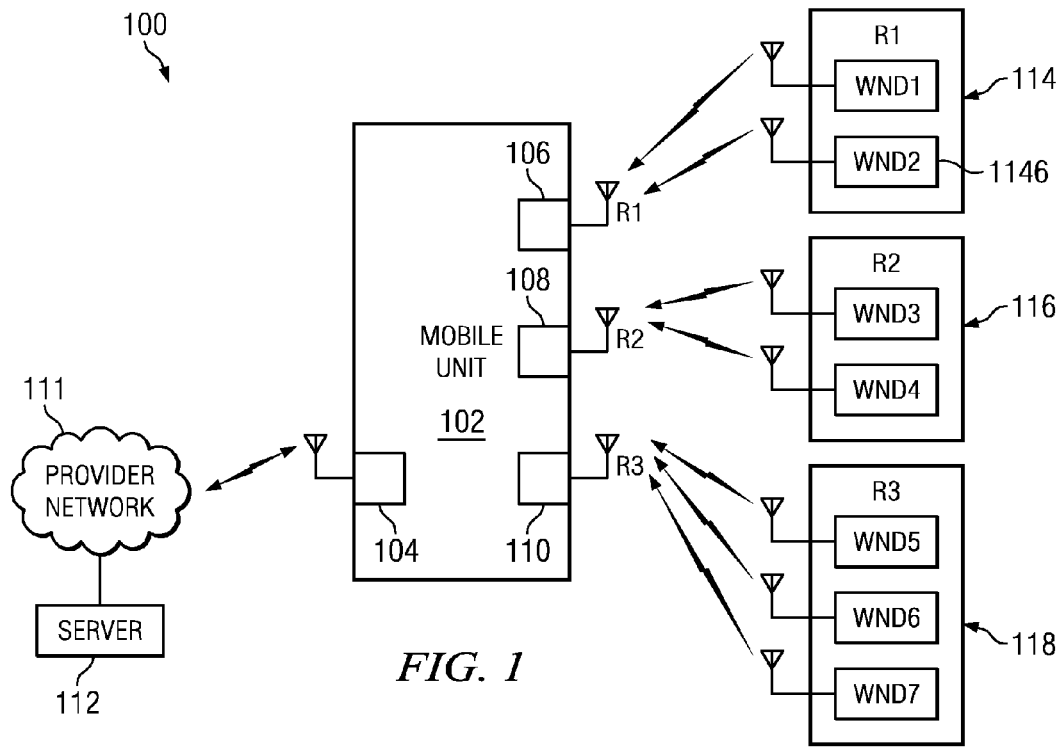
FIG. 1 illustrates an embodiment of a system for automating actions based upon scanned wireless signals in the proximity of a mobile unit.

Referring now to the drawings, wherein like reference numbers are used herein to designate like elements throughout, the various views and embodiments of automatic actions within a phone network based upon scanned wireless signals are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates an embodiment of a system 100 for automating actions based upon the presence of scanned wireless signals in the proximity of a mobile unit. In various embodiments, the system 100 provides a platform for automating actions within a mobile unit such as a mobile phone, a tablet PC or within a network based upon the presence or lack thereof of detected wireless signals by the mobile unit. The system 100 includes a mobile unit 102 having the capability to receive one or more types of wireless signals transmitted by wireless network devices or other wireless sources. In various embodiments, the mobile unit 102 may include a cell phone, a smart phone, a PDA, a tablet device, or any other type of network communication device. In the particular embodiment illustrated in FIG. 1, the mobile unit 102 includes a cellular transceiver 104, a Bluetooth transceiver 106, a Wi-Fi transceiver 108, and a near field communication (NFC) or radio-frequency identification (RFID) transceiver 110. The cellular transceiver 104 includes the capability to receive cellular signals transmitted by a provider network 111. In particular embodiments, the cellular signals may include one or more of CDMA, GSM, LTE, or any other cellular transmission technology. The Bluetooth transceiver 106 includes the capability to receive signals transmitted using Bluetooth technology such as that specified by the IEEE standard 802.15.1 in the 2.4 GHz frequency spectrum. The Wi-Fi transceiver 108 is configured to receive signals transmitted by wireless network devices using Wi-Fi technology such as that specified in various IEEE 802.11 standards. The near field communication (NFC) transceiver 110 is configured to receive signals transmitted by wireless network devices using near field communication technologies such as those specified by ISO Standard 13157 using the 13.56 MHz frequency spectrum or RFID signals using technologies such as those specified by ISO/IEC 14443, ISO 14223, ISO/IEC 15693, ISO/IEC 18000, ISO/IEC 18092, ISO 18185, or ISO/IEC 21481 standards. Near field communication (NFC) allows for simplified transactions, data exchange and wireless connections between two devices in close proximity to one another, usually by no more than a few centimeters. Also, 802.15.xx can be included such as the 802.15.4 low power standard supporting such applications as Zigbee. In another embodiment, RFID technologies may have the same capabilities and characteristics as that of NFC technologies.

The system 100 includes a server 112 in communication with the provider network 111. The server 112 includes a database for storing various wireless fingerprints as will be further described herein. The system 100 further includes a plurality of Bluetooth wireless network devices 114, a plurality of Wi-Fi wireless network devices 116, and a plurality of NFC or RFID wireless network devices 118. The system 100 may further include a plurality of cellular towers. The Bluetooth wireless network devices 114 include a first Bluetooth wireless network device WND1 and a second Bluetooth wireless network device WND2. The Bluetooth wireless network devices may include any wireless network device capable of transmitting a Bluetooth signal including a laptop computer, a cell phone, a smart phone, a television or set-top box equipment, a Bluetooth equipped automobile or a Bluetooth headset. Bluetooth signals transmitted by each of the Bluetooth wireless network devices 114 are received by the Bluetooth transceiver 106 of the mobile unit 102. The Wi-Fi wireless network devices 116 include a first Wi-Fi wireless network device WND3 and a second Wi-Fi wireless network device WND4. The Wi-Fi wireless network devices 116 transmit Wi-Fi signals which are received by the Wi-Fi transceiver 108 of the mobile unit 102. The Wi-Fi wireless network devices 116 may include a mobile device having Wi-Fi capability, a router, a wireless access point, or any other source of Wi-Fi signals. The NFC wireless network devices 118 include a first NFC wireless network device WND5, a second NFC wireless network device WND6, and a third NFC wireless network device WND7. The NFC wireless network devices 118 are configured to transmit NFC or RFID wireless signals.

In an exemplary operation of the system 100, the mobile unit 102 contains a software application or operating system which, when executed, has the capability to cause the mobile unit 102 to scan for the presence of wireless signals received by one or more of the cellular transceiver 104, the Bluetooth transceiver 106, the Wi-Fi transceiver 108, and a near field communication (NFC) or RFID transceiver 110. In a particular embodiment, the software application may be previously downloaded by a user to the mobile unit 102 from an application store, application marketplace, or a website. Upon detecting the one or more wireless signals, the mobile unit 102 obtains identifying information from each of the wireless signals. In particular embodiments, the mobile unit 102 obtains a media access control (MAC) address or other identifier from the detected wireless signal. The MAC address uniquely identifies the wireless network device that transmits a particular wireless signal. For example, the MAC address may be associated with a Wi-Fi device, a Bluetooth device, an NFC or RFID device. Additionally a unique identifier can be received from a cellular tower. In still other embodiments, the mobile unit 102 may further determine signal strength of each of the received signals, the time of reception of the signal by the mobile unit 102, and the location of the mobile unit 102 when the signal was received, such as by using GPS signals or cellular or WiFi triangulation. An advantage offered by the system 100 is that the mobile unit 102 does not have to actually establish a connection with a particular wireless network device in order to obtain the identifying information; it merely has to detect and receive a signal transmitted by such a wireless network device containing information unique to that device such as a MAC address and also non unique information such as a friendly ID. In other embodiments, both a MAC address and user ID (UID) may be used to identify a wireless signal. For example, some devices such as iPhones® do not allow applications access to the MAC address of a device from another iPhone®, but they do reveal a portion of their device ID with is a hash of the serial number and the software ID. This may be unique on a software-by-software basis, so that one phone may have one ID for one application, and another unique ID for another application but such is unique to that phone or mobile unit.

Upon scanning the wireless signals transmitted from one or more wireless network devices by the mobile unit 102, the mobile unit 102 collects identifying information from each of the wireless signals and transmits the identifying information such as the MAC address, signal strength, time, and any other parameters to server 112 via the provider network 111. The server 112 then performs one or more heuristic algorithms on the collected information to determine a "wireless fingerprint" associated with the current proximity of information from the mobile unit 102. The wireless fingerprint is determined based upon the identifying information associated with one or more of the wireless signals obtained during the scanning operation of the mobile unit 102 at that specific relative device location and time. If the particular wireless fingerprint has not previously been registered with the server 112, the user of the mobile unit 102 may be prompted to designate the wireless fingerprint as associated with the present location of the mobile units 102. If the server 112 recognizes the wireless fingerprint as previously being registered, the server 112, in one embodiment sends an indication to either the mobile unit 102 or another network device to perform an action associated with that particular wireless fingerprint. In one embodiment, the designated action may be an action that is to be performed by the mobile unit 102. In still other embodiments, the designated action may be an action performed by a network device, such as a switch, of the provider network 111. For example, an action which may be associated with the mobile unit 102 includes vibration of the mobile unit 102, showing the location of an item on a map, displaying a video on the mobile unit 102, or displaying an advertisement on the mobile unit 102 upon detection of a particular wireless fingerprint. Another embodiment may be an action whereby a location indicator is placed on a map, referred to as "dropping a pin on the map."

In another example, recognition of a particular wireless fingerprint may cause the provider network 111 to change call routing or initiate a call via a switch. For example, a user may designate a scan of the environment of an office for wireless signals and designate that location as the user's office using the mobile unit 102. The server 112 determines a wireless fingerprint associated with the office location from the identifying information of the wireless signals and the user may designate that, upon detection of the wireless fingerprint associated with the office location, calls addressed to the mobile unit 102 should be routed to a telephone within the office instead. In still another example, the recognition of a particular wireless fingerprint may cause a network device such as a television, router, or set-top box to perform a specific action upon detection of the mobile unit 102 being in the presence of the associated wireless fingerprint. In a particular example, music may be streamed from the mobile unit 102 to the network device upon detection of a particular wireless fingerprint.

Although various embodiments may describe a wireless fingerprint as being associated with a "location" it should be understood that a wireless fingerprint may not necessarily be associated with a static location. For example, a user may associate a wireless Bluetooth signal associated with a friend's mobile telephone to an action of vibrating the mobile unit 102. Upon the detection of the wireless fingerprint associated with the friend's mobile telephone by the mobile unit 102, such as when the friend arrives at the same party as the user, the mobile unit 102 may automatically vibrate to indicate to the user that the friend has arrived. Further, the wireless fingerprint may comprise multiple wireless inputs that are mobile.

Although it is described in various embodiments that the server 112 performs various actions such as recognizing a wireless fingerprint and determining a fingerprint from detected signals, it should be understood that in other embodiments, recognition of a fingerprint and/or determining of a fingerprint may be performed by other devices such as by the mobile unit 102. Furthermore, additional network devices such as cellular networks or networking equipment on an internal wireless infrastructure (WLAN) could contain the recognition software as well. In other embodiments, a Wi-Fi router contains the detection software and performs the rules-based database lookup. In still other embodiments, a cellular tower contains the detection software and performs the rules-based database lookup.

Figure 2:
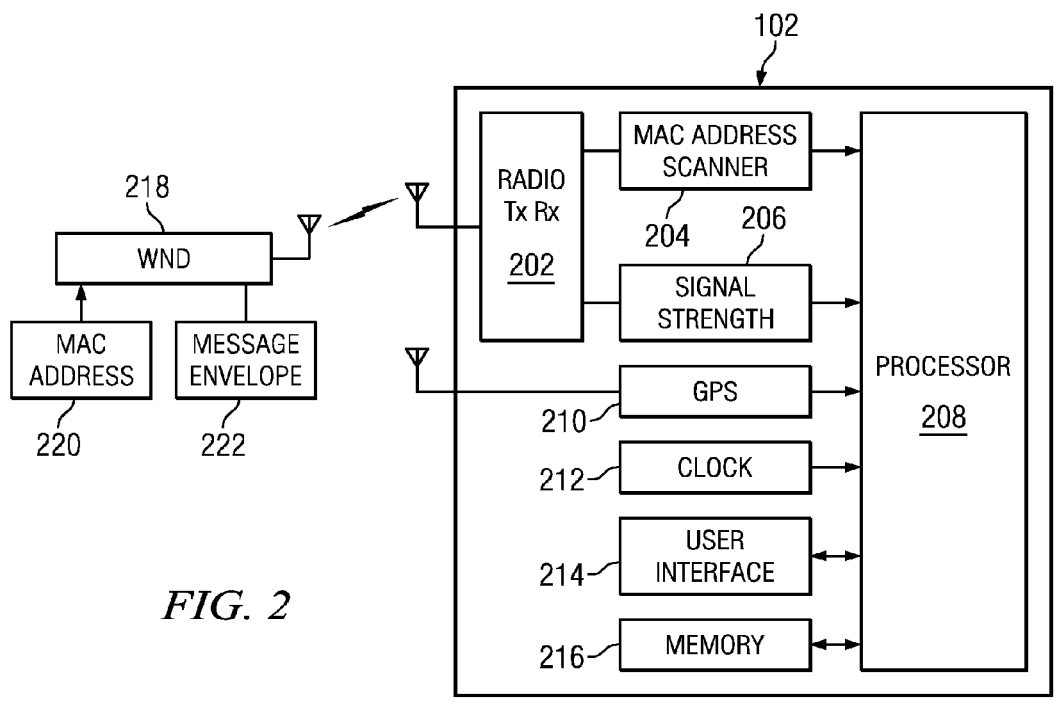
FIG. 2 illustrates an embodiment of a mobile unit and a wireless network device.

FIG. 2 illustrates an embodiment of a mobile unit 102 and a wireless network device 218. The mobile unit 102 includes a radio transceiver 202 configured to receive one or more wireless signals within the environment of the mobile unit 102. Although in the particular embodiment illustrated in FIG. 2, the wireless mobile unit 102 includes a single radio transceiver 202, it should be understood that the mobile unit 102 may include a number of different radio receivers each configured to receive a different type of wireless signal such as cellular, Wi-Fi, Bluetooth, and NFC, as previously described. The mobile unit 102 further includes a MAC address scanner module 104 coupled to the radio transceiver 202 and configured to determine a MAC address associated with a particular wireless signal received by the radio transceiver 202. The mobile unit 102 further includes a signal strength module 206 coupled to the radio transceiver 202 and configured to determine a signal strength associated with the received wireless signal. The MAC address scanner module 204 and the signal strength module 206 are further coupled to a processor 208 to provide the MAC address and signal strength to the processor 208. The mobile unit 102 includes a GPS module 210 configured to receive a GPS signal and provide the GPS signal to the processor 208 in order to determine a location associated with the mobile unit 102. In still other embodiments, the mobile unit 102 may determine its location via cellular triangulation or any other method for location determination such as assisted GPS. The mobile unit 102 further includes a clock module 212 coupled to the processor 208 and configured to provide a time associated with the reception of a signal to the processor 208. The mobile unit 102 includes a user interface 214 coupled to the processor 208 to allow a user to provide user inputs to the processor 208 as well as allow the processor 208 to provide outputs to the user. For example, in a particular embodiment, the user interface may include a touch screen or keypad to provide input to the mobile unit 102, and a display screen to provide output to the user. The mobile unit 102 further includes a memory 216 coupled to the processor configured to store the scanning application, identifying information associated with received wireless signals such as MAC addresses and signal strengths, locations and times, as well as store other data required by the mobile unit 102 during operation.

The wireless network device 218 has a MAC address 220 uniquely associated with the wireless network device 218 and a message envelope 222. The wireless network device 218 transmits a wireless signal within a message envelope 222 which includes the MAC address 220. This is basically a "broadcast" as all listening devices can receive this information without the requirement for bi-directional communication. The radio transceiver 202 of the mobile unit 102 receives the wireless signal transmitted from the wireless network device 218, extracts the MAC address associated with the wireless signal and determines a signal strength associated with the wireless signal. The mobile unit 102 may further determine a GPS location and time of receipt associated with the received wireless signal from the GPS module 210 and clock module 212, respectively. The mobile unit 102 then transmits the identifying information associated with the wireless signals received from the wireless network device 218 to the server 112 via the radio transceiver 202.

Figure 3:
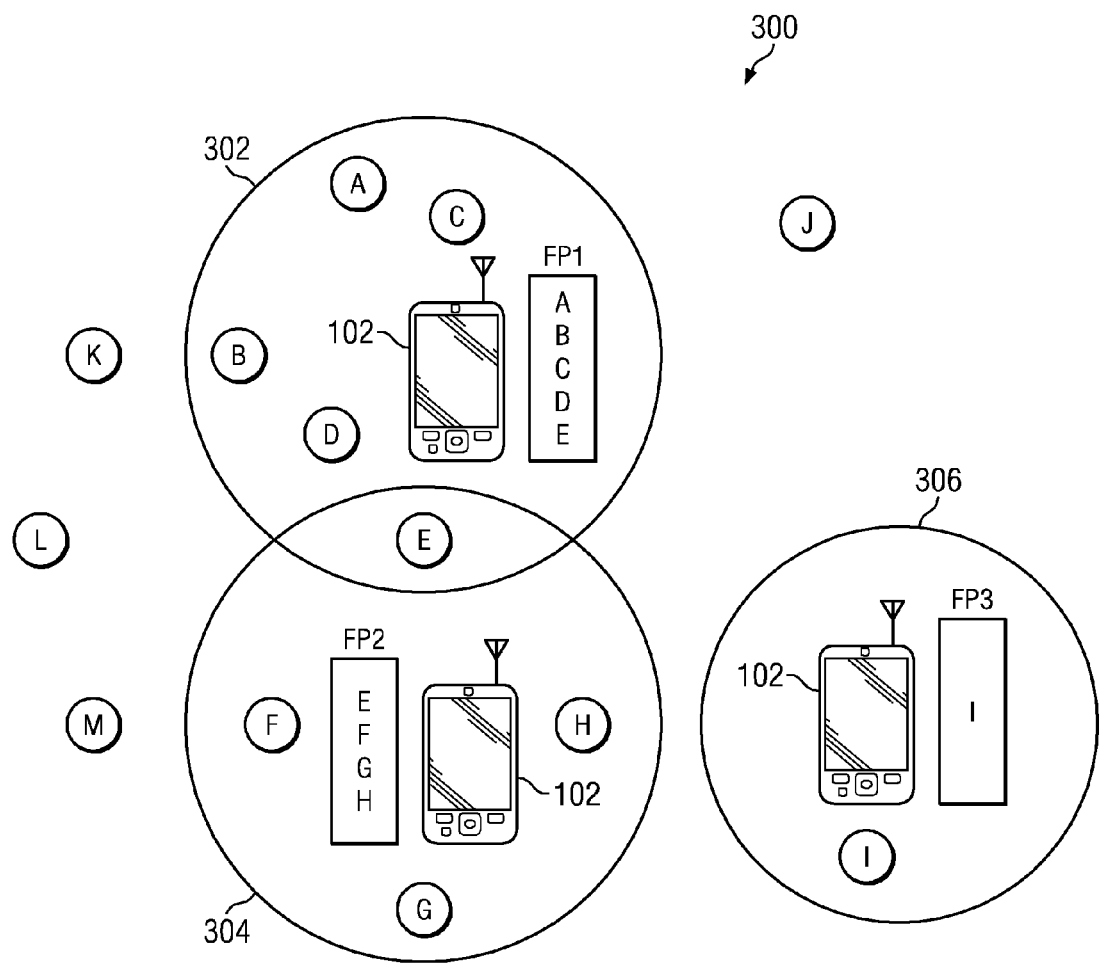
FIG. 3 illustrates an exemplary environment in which the mobile unit operates within different locations in which each location has a different wireless fingerprint associated therewith.

FIG. 3 illustrates an exemplary environment 300 in which the mobile unit 102 operates within different locations in which each location has a different wireless fingerprint associated therewith. In the embodiment illustrated in FIG. 3, the mobile unit 102 is illustrated as being in three different physical locations as will be further described. The environment 300 includes a number of wireless network devices (WNDs) A-M. In a first location of the mobile unit 102, the mobile unit 102 possesses a reception range 302 in which the mobile unit 102 is able to receive wireless signals from wireless network devices A, B, C, D, E. The pattern can be any space and the circular shape is by way of example only. It should be understood that the reception pattern has a reception boundary defined by the weakest signal that can be received, this a function of the sensitivity of the receiver, the antenna gain, atmosphere and environmental conditions, etc. From the wireless signals transmitted by each of wireless network devices (WNDs) A-E, a first wireless fingerprint FP1 is obtained consisting of identifying information from respective wireless signals transmitted by wireless network devices A, B, C, D and E. Although for simplicity the embodiment illustrated in FIG. 3 is shown as using identifiers associated with each of the wireless network devices as a fingerprint, it should be understood that the actual fingerprint may include a MAC address, signal strength, time, and location of each of the wireless signals as well as other identifying information. In a second location, the mobile unit 102 has a reception area 304 which encompasses the wireless signals emitted by a wireless network device E, F, G, and H. The resulting second fingerprint FP2 includes the wireless signals transmitted from wireless network devices E, F, G, and H. In a third location, the mobile unit 102 has a reception area 304 which encompasses the wireless signal from only a single wireless network device I. The resulting third wireless fingerprint FP3 includes the wireless signal transmitted by wireless network device I. In the embodiment illustrated in FIG. 3, wireless network devices J, K, L and M sources represent wireless signals which are not received by the mobile unit 102 while the mobile unit 102 is at any of the illustrated three locations of the environment 300.

FIG. 4 illustrates an example of an actual measured signal strength of wireless network signals by the mobile unit 102 and two stored wireless fingerprints. In FIG. 4, an actual measured signal strength of wireless signals received by a mobile unit 102 at a particular location is shown in 402. A stored wireless fingerprint "Stored A" is illustrated by 404, and a stored wireless fingerprint "Stored B" is illustrated by 406. The wireless fingerprint Stored A (404) and wireless fingerprint Stored B (406) are stored within the database of the server 112. The baseline represents the plethora of possible devices that may exist in a global database.

The actual measured signals 402 are compared against the stored fingerprints Stored A and Stored B by the server 112 to determine whether the actual measured signals are an acceptable match to a stored wireless fingerprint. In various embodiments, the server may use heuristics to determine whether the actual measured signals 402 match a stored fingerprint Stored A (404) or stored B (406). As can be seen in FIG. 4, none of the stored fingerprints (404, 406) are an exact match of the actual measured wireless signals 402. Signal strengths of the actual signals 402 differ from those of the stored fingerprints 404 and 406, i.e., different devices, signal strengths, etc. In addition, the stored fingerprints 404 and 406 contain signals that are not present in the actual measured signals 402. In a particular embodiment, the server 112 may determine that fingerprint Stored A 404 is the closest match to the actual measured signals 402 and that it matches fingerprint Stored A 404 to an acceptable level. As a result, the server 112 will send an indication, for example to the mobile unit 102, to perform an action associated with fingerprint Stored A (404).

The aspect of what constitutes a match is not necessarily an "exact" match. The comparison operation is one that compares the captured fingerprint with the data store and determines the best match. It may be that there is only a 70% match and a threshold is set that declares this as the best match. Suppose that only three know devices were sensed as being present. An algorithm can be set that determines a best match to be having at least three devices present that match to any stored fingerprint and at least one of those having associated attributes in the captured fingerprint that is within 90% of the stored fingerprint—one of those attributes possibly being signal strength. In a Heuristic type algorithm, there is a voting algorithm that can be employed wherein, if there are five fingerprints that have at least 60% of the devices precent—for example—then a vote is taken as to which is the closest as to stored attributes. As such, it is not necessary to determine an exact match but, rather, the best match based on a set of predetermined criteria.

Referring further to FIG. 4, the actual measurement 402 is illustrated as having multiple devices that are present within the scanning range of the mobile unit. There is provided a device 410, a device 412, a device 414, a device 416 and a device 418, all of these represented by their relative signal strengths. It can be seen that the device 412 has a signal strength that is higher than all the others. The device 418 has the second strongest signal strength of all, followed by the device 414, followed by the device 410 and followed by the device 416. It should be understood that the signal strength is a function of orientation of a mobile unit and various environmental conditions. For example, if a mobile device were disposed in a static position within an environment, the environment may actually change. For example, people could be moving around in the environment and this would change the RF characteristics of the room. This might attenuate one or more of the signals of the devices 410-418. However, each of the devices would have some unique ID such as a MAC address in addition to the associated signal strength at a particular given time.

With respect to the archived fingerprint 404, the initial Stored A fingerprint 404, it can be seem that there is a device 410', a device 412', a device 414', a device 416' and a device 418' that are associated with that fingerprint. These devices 410'-418' correspond to the devices 410-418 in the actual fingerprint 402. Thus, the Stored A fingerprint 404 illustrates all of the same devices as well as an additional device 420. Thus, at some point in time, another mobile unit or the same mobile unit had measured the presence of these five devices 410'-418' as well as an additional device 420. It may have been in the same room or a different position in the room, as the signal strengths are slightly different.

With respect to the Stored B fingerprint 406, it can be seen that there are devices 410", 412", 414", 420', 416" and 418". Thus, the devices 410"-418" correspond to the devices 410-418 of fingerprint 402 in the actual measured fingerprint. The additional device 420' over that in the actual fingerprint corresponds to the device 420 in the Stored A fingerprint 404. Thus, whenever the Stored B fingerprint 406 was taken by either the same mobile device or a different mobile device and stored, the same devices were present in the Stored B fingerprint 406 as were present in the current measured fingerprint 402 with the addition of device 420' corresponding to device 420 in the Stored A fingerprint 404. Of course, there were different signal strengths. Additionally, there is a further device 422 that exists in the Stored B fingerprint 406 but was not present in either the actual current measured fingerprint 402 or the Stored A fingerprint 404.

Each of the devices 410-418 and 420 and 422 can be realized with any type of RF device that radiates power and an ID that can be picked up by the radio receiver in the mobile device. Some of these devices are Bluetooth devices or other types of 802.xx.xxx devices. Bluetooth devices, for example, have a sleep mode such that they are not always transmitting. It could be that the device 422 was actually asleep when the Stored A fingerprint 404 was taken or when the actual fingerprint 402 was taken. Thus, the device 422 may still be within the environment of the mobile device at the time of the fingerprint 402 but the device 420 was actually in sleep mode at that time. Of course, if enough samples were taken over a longer period of time, the devices may "pop up" and be included in the fingerprint.

The comparison of the actual fingerprint with the two stored fingerprints is, as described hereinabove, done with some type of algorithm utilizing, for example, heuristics. This particular heuristics algorithm, although it is not the only algorithm that could be utilized, is one that basically "votes" which fingerprint is the closest due to the nature of the observed wireless technology. There may be, for example, a dominant device such as a device 412 that must be there for the fingerprints to have a valid comparison. For example, it might be that a particular MAC address is required to be present as is associated with a WiFi device, which would have a larger radio "footprint" than Bluetooth or NFC, which are typically shorter range. This could be indicated by the friendly name that is associated with that particular name 412. If that device were there, that would be first aspect that would be required in order to have a match (there can also be some weighting as to certain MAC addresses as to their fixed or mobile nature). Thereafter, there may be other devices that would be required, as these devices are considerably more semi-permanent devices. Though the number of devices that match with the devices in the actual fingerprint 402 would be one factor, the signal strength of the devices would be another factor and the lack of additional devices would be an even further factor. Thus, the Stored A fingerprint 404 may better match the actual fingerprint 402.

FIG. 5 illustrates an embodiment of a database 500 within the server 112 for storing wireless fingerprints. The database 500 contains fields associated with each of the wireless signals detected by the mobile unit 102 which are used in determining a particular wireless fingerprint. The database 500 includes a MAC address field 502, a time field 504, a GPS location field 506, a signal strength field 508, a mobile unit ID field 510 and a fingerprint group 512. The MAC address field 502 includes a MAC address associated with a particular wireless signal, the time field includes the time of reception of a particular wireless signal, the GPS location field 506 includes a GPS location of the mobile unit 102 at the time of the reception of a particular wireless signal, and a signal strength field 508 includes a measured signal strength of a particular wireless signal. The mobile unit ID field 510 includes a mobile unit ID associated with the mobile unit 102, and the fingerprint group field 512 contains an indication of a particular fingerprint to which the detected wireless signal belongs.

Figure 6:
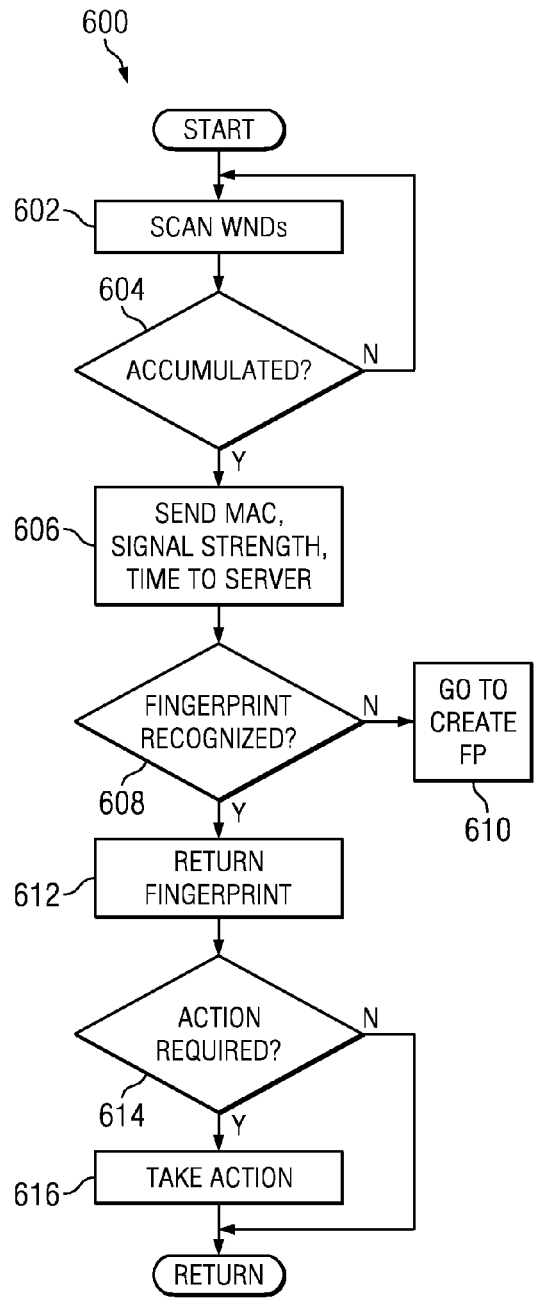
FIG. 6 illustrates an embodiment for executing a scanning procedure of the mobile unit.

FIG. 6 illustrates an embodiment of a procedure 600 for a executing a scanning procedure of the mobile unit 102. In various embodiments, the scanning procedure is performed by a software application executed by the mobile unit 102. In step 602, the mobile unit 102 scans the frequency spectrums receivable by the mobile unit 102 for the presence of wireless network device signals and determines the MAC address, signal strength, and time of reception of any wireless signal received from a wireless network device. In step 604 it is determined whether all of the receivable wireless signals have been accumulated. If not all of the receivable wireless signals have been accumulated, the procedure returns to step 602 in which scanning is continued. If all the receivable wireless network signals have been accumulated, the procedure continues to step 606 in which the MAC address, signal strength and time of reception of each of the detected wireless network signals are sent to the server 112. In some embodiments, the location of the mobile unit 102 during the reception of each of the wireless network signals may also be sent to the server 112. In step 608 it is determined whether a wireless fingerprint represented by the received wireless network signals is recognized by the server 112. The server 112 determines whether the received wireless network signals match a fingerprint in the database of the server 112 using heuristic or any other algorithm. If the wireless fingerprint is not recognized, the procedure continues to step 610 in which a procedure to create a fingerprint associated with the currently received wireless signals is initiated. This procedure will be further described herein with respect to FIG. 8. If the fingerprint is recognized in step 608, a fingerprint identifier is returned in step 612. In step 614, it is determined whether an action is required due to the detection of the wireless fingerprint. If no action is required, the procedure returns to the start. If it is determined in step 612 that an action is required, the required action is taken in step 614 and the procedure returns to the start.

Figure 7:
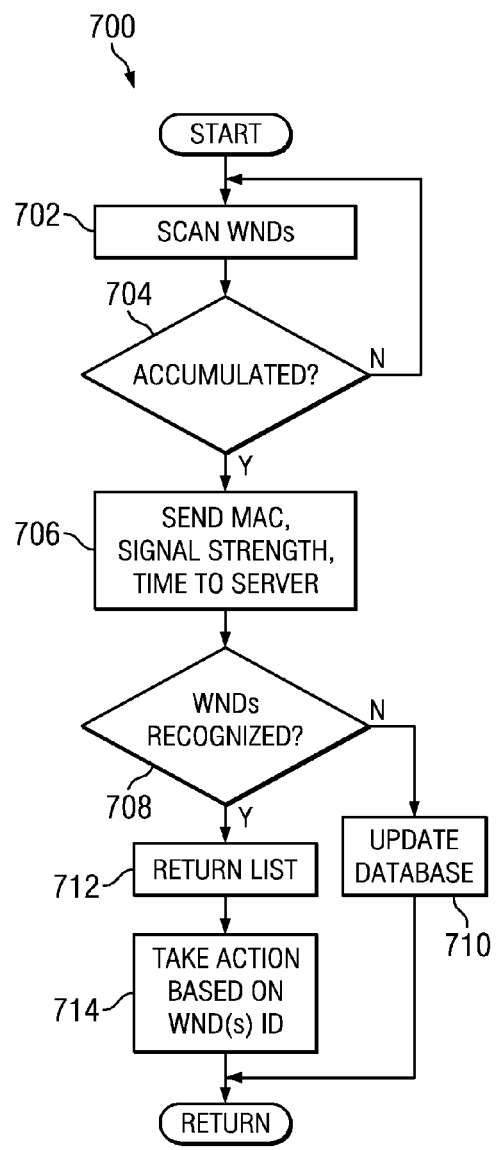
FIG. 7 illustrates an embodiment of a procedure in which the scanning procedure of the mobile unit automatically collects fingerprint data of the environment in which the mobile unit is located.

FIG. 7 illustrates an embodiment of a procedure 700 in which the scanning procedure of the mobile unit 102 automatically collects fingerprint data of the environment in which the mobile unit 102 is located. In step 702, the mobile unit 102 scans for the presence of wireless signals associated with wireless network devices. In step 704 it is determined whether all receivable wireless signals have been accumulated and, if not, the procedure returns to step 702 in which scanning continues. If all the wireless signals have been accumulated, the procedure continues to step 706 in which the MAC address, signal strength, and times associated with the wireless signals are sent to the server 112. In step 708, the server 112 determines whether the wireless network devices are recognized as being previously detected within the database of the server 112. If the wireless network devices are not recognized, the procedure continues to step 710 in which the database within server 112 is updated to include the identifying information associated with the newly scanned wireless signals. The procedure 700 then returns to start. If all the wireless network devices are recognized in step 708, the procedure continues to step 712 in which a list of the wireless network devices is returned to the mobile unit 102. In step 714 any action associated with a fingerprint represented by the detected wireless network devices is taken, and the procedure 700 then returns to the start.

Figure 8:
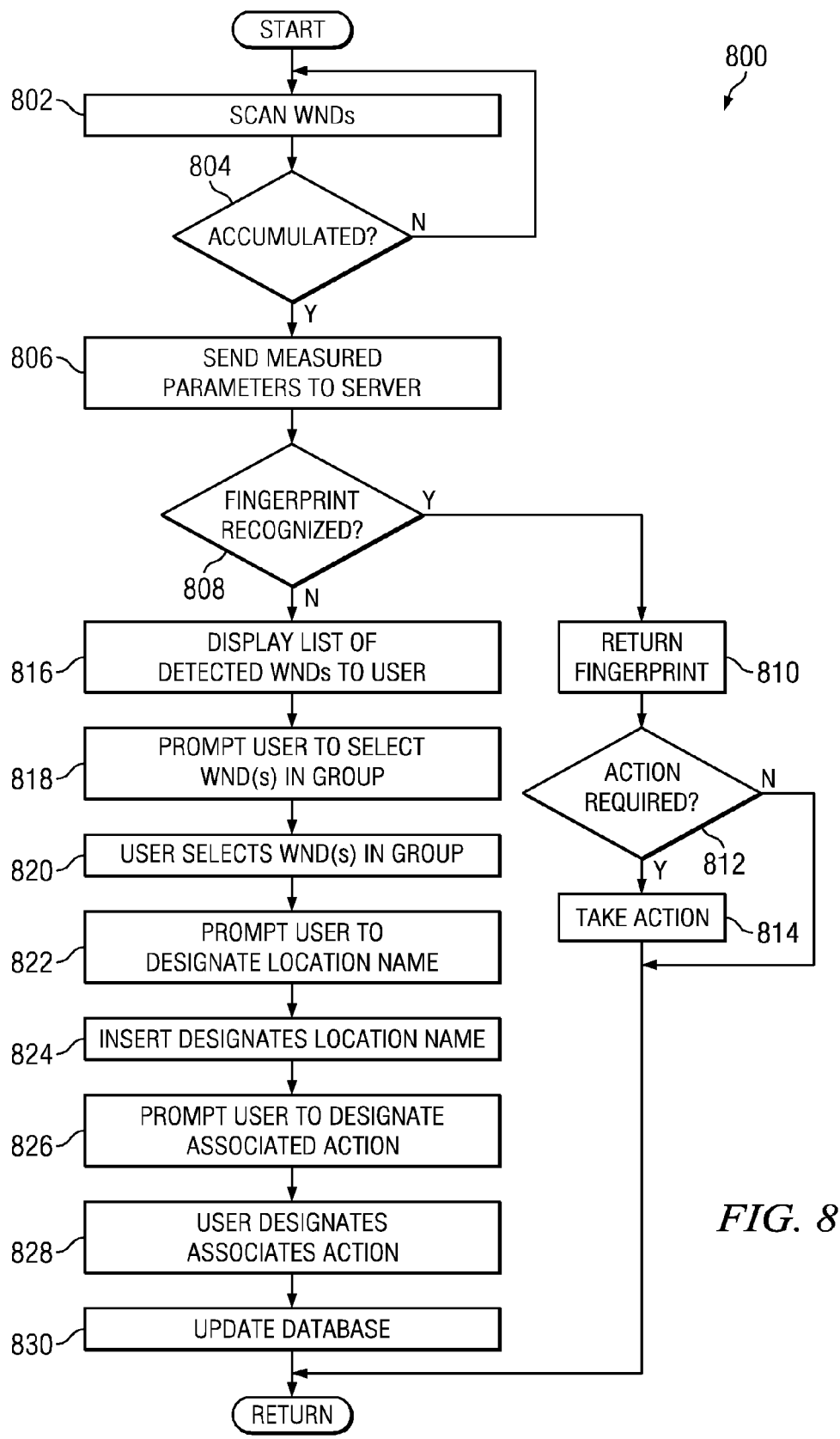
FIG. 8 illustrates an embodiment of a procedure for scanning wireless network devices and associating an action with a wireless fingerprint.

FIG. 8 illustrates an embodiment of a procedure 800 for scanning wireless network devices and associating an action with a wireless fingerprint. In step 802, the mobile unit 102 scans for wireless network devices. In step 804, the mobile unit 102 determines whether all of the available wireless network devices having wireless signals scannable by the mobile unit 102 have been accumulated. If it is determined in step 804 that the scanned wireless network devices have not been accumulated, the procedure returns to step 802 in which the scanning of wireless network devices is continued. If it is determined in step 804 that the scanned wireless network devices have been accumulated, the procedure 800 continues to step 806. In step 806, the mobile unit 102 sends the measured parameters of each of the scanned wireless network device signals to the server 112. The measured parameters may include one or more of the MAC address, signal strength, time of reception, and location of the mobile unit 102 of each of the scanned wireless signals from each of the wireless network devices. In step 808, the server 112 determines whether the wireless fingerprint associated with the scanned wireless network devices is recognized by the server 112. If the fingerprint is recognized, the procedure continues to step 810 in which the fingerprint is returned from the database of the server 112. In step 812, it is determined whether an action associated with the fingerprint is required to be performed. In one embodiment, the determination of whether an action is to be performed in association with the recognition of a wireless fingerprint is done by the mobile unit 102. In still other embodiments, the recognition of whether an action is required to be performed by the detection of an associated fingerprint is performed by the server 112 or by a node associated with the provider network 111. If no action is required, the procedure returns to the start. If an action is required the action is taken in step 814. In various embodiments, the action may be performed by one or more of the mobile unit 102, the server 112, or a network node associate with a provider network 111.

If it is determined in step 808 that the fingerprint is not recognized, the procedure continues to step 816 in which a procedure allowing a user to create a fingerprint to be associated with the currently received wireless signals is initiated. In step 816, a list of detected wireless network devices is displayed to the user of the mobile unit 102. In step 818, the user is prompted to select one or more of the wireless network devices as a group. In step 820 the user selects the wireless network devices in the group which are to be included in the created wireless fingerprint. In other embodiments, step 820 may be omitted and the designation of which signals are to be included in the created fingerprint is performed automatically by the server 112 or the mobile unit 102. In step 822, the user is prompted to designate a location name to be associated with the selecting group of wireless network devices that are to form the fingerprint. In step 824, the user designates the location name. For example, the user name may designate a location name to be associated with a particular group of selected wireless network devices as a home, office, or the name of a particular restaurant. In step 826, the user is prompted to designate an associated action with the selected group. In a particular embodiment, the user may be presented with a list of available actions from which to choose from. In step 828, the user designates the associated action. Examples of associated actions may include notification by the mobile unit 102 that a wireless fingerprint associated with the selected group has been detected, routing incoming calls to a telephonic device at the designated location upon detection of the wireless fingerprint, or initiating an action within a network device such as streaming media to a set-top box connected to a television upon the mobile unit 102 detecting the wireless fingerprint associated with the location of the set-top box. In still other examples, the designated action to be associated with a particular wireless fingerprint may include the launching of an application on the mobile unit 102 or to stream audio or video to the mobile unit 102 upon detection of the wireless fingerprint. In step 830, the database of the server 112 is updated to include the measured parameters associated with the wireless fingerprint, the location name, and the associated action as well as an identifier associated with the mobile unit 102 or the user of the mobile unit 102. The procedure 800 then returns.

Figure 9:
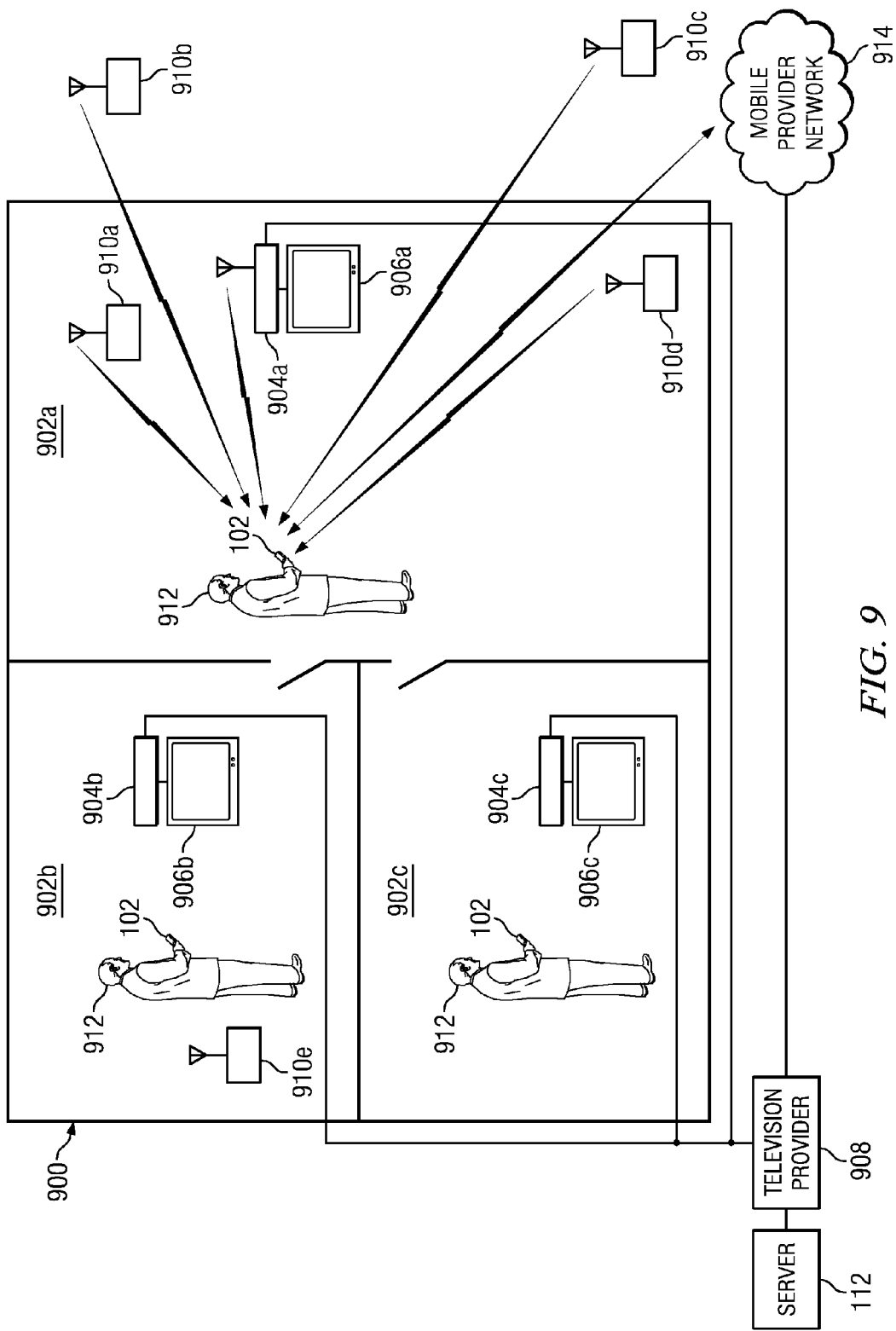
FIG. 9 illustrates an embodiment of a system for use in a residential environment for controlling a set-top box by a mobile unit based upon a detected wireless fingerprint.

FIG. 9 illustrates an embodiment of a system for use in a residential environment for controlling a set-top box by a mobile unit based upon a detected wireless fingerprint. In the embodiment illustrated in FIG. 9, a residential structure 900, such as a home, includes a first location 902A, a second location 902B and a third location 902C. In a particular embodiment, the first location 902A, second location 902B, and third location 902C are separate rooms of a home. The first location 902A has a gateway set-top box 904A connected to a video display device 906A thereat. In a particular embodiment, the first video display device 906A is a television. The second location has a second set-top box 904B connected to a second video display device 906B, and the third location 902C has a third set-top box 904C connected to a third video display device 906C. The gateway set-top box 904A, the second set-top box 904B, and the third set-top box 904C are each connected to a television provider 908 via a network such as a cable, DSL network, or wireless network. The television provider 908 further includes a server 112 incorporated therewith. The server 112 includes a database for storing wireless fingerprints as previously described herein. The residential environment includes a plurality of wireless network devices 910A-910E located within and/or external to the residential structure 900. Each of the plurality of wireless network devices 910A-910E are configured to transmit wireless signals including a MAC address. In various embodiments, the wireless network devices 910A-910E may include any combination of wireless signal emitters such as Wi-Fi, Bluetooth, NFC and cellular tower signals. A user 912 having a mobile unit 102 in possession may be located in the first location 902A, second location 902B or third location 902C of the residential structure 900 at different times. The mobile unit 102 is configured to communicate with a mobile provider network 914, and the mobile provider network 914 is in communication with the television provider 908. As previously described herein, the mobile unit 102 is configured to scan for the presence of wireless signals from one or more of the wireless network devices 910A-910E and perform an action if a previously registered wireless fingerprint is recognized. In a particular embodiment, the gateway to the set top box 904A may include Wi-Fi or Bluetooth capability whereas the second set-top box 904B and the third set-top box 904C may not include wireless capability.

In a particular example, the user 912 stands proximate to the gateway set-top box 904A in the first location 902A and runs an application on the mobile unit 102 which scans for the presence of wireless signals from the various wireless network devices 902A-902E which are currently receivable. The user 912 may then select an identification of the appropriate set-top box, that is the gateway set-top box 904A that it is currently proximate to, and this data is sent to the television provider 908 via the mobile provider network 914. A server 112 determines a wireless fingerprint and correlates the location of the user 912 with the wireless fingerprint using heuristics or some similar algorithm. Similarly, the user 912 may stand proximate to each of the second set-top box 904B and the third set-top box 904C and register the mobile unit 102 with each of them respectively by measuring or determining a wireless fingerprint at each of the second location 902B and the third location 902C. Since the receivable signals and signal strengths of the receivable signals will differ at each of the first location 902A, the second location 902B and the third location 902C, each of the first location 902A, second location 902B, and third location 902C will have a different wireless fingerprint associated therewith. Once a mobile unit 102 is registered with a particular set-top box, the mobile unit 102 may be used to control the particular set-top box upon detection of the wireless fingerprint associated with the location of that particular set-top box. Thus, the user 912 is able to move throughout the residential structure 900 and control particular set-top boxes using the mobile unit 102 without requiring the user 912 to designate the particular set-top box that is desired to be controlled.

In a particular example, the mobile unit 102 is configured to host photos using videos or other data. A user then enters the residential structure 900 and the mobile unit 102 executes a software application. The application scans for the wireless fingerprint of the current location within the residential structure 900, determines which set-top boxes are available to present photos, music or other data, and the mobile unit 102 is authenticated with each of these set-top boxes. In a particular embodiment, the user may see an indication on the video display device that the mobile unit 102 has been authenticated with the set-top box. Data on the phone, such as music and videos may be then sent over the mobile provider network 914 to the television provider 908, then sent to and received by a set-top box within the residential structure 900 over the television provider network. In particular embodiments, the audio, video or other presentation may follow the user 912 as it moves to different locations throughout the residential structure 900 so that it is routed to the appropriate set-top box associated with the location in which the user 912 is currently positioned. An advantage of such a system is that media may be presented from a mobile unit 102 on video display devices without requiring the mobile unit 102 to be authenticated on a Wi-Fi or other home network associated with the residential structure 900.

Figure 10:
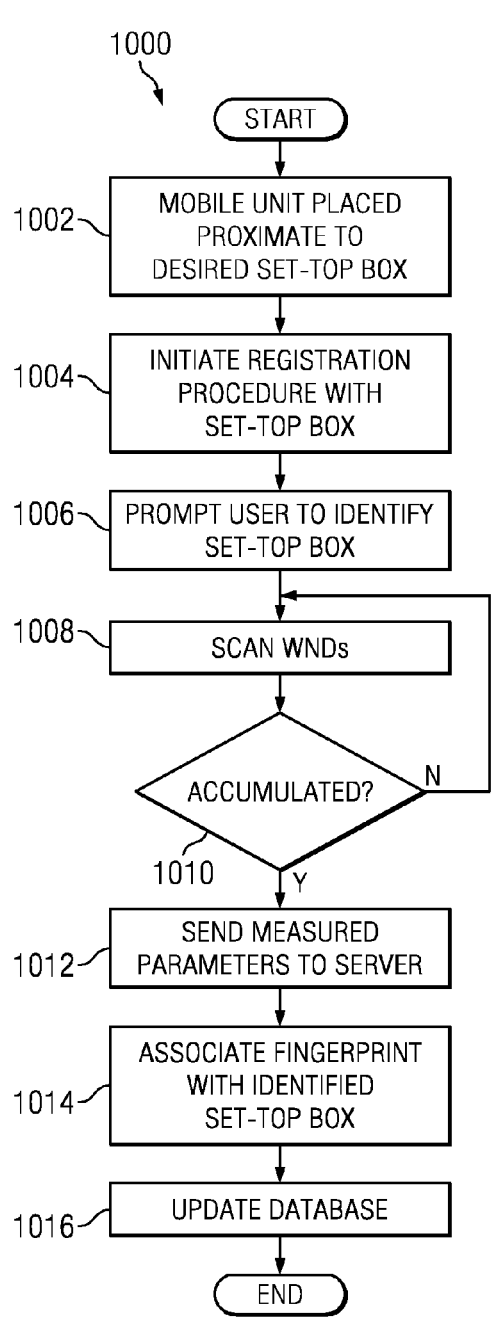
FIG. 10 illustrates an embodiment of a procedure for registering the mobile unit with a set-top box of the residential environment illustrated in FIG. 9.

FIG. 10 illustrates an embodiment of a procedure 1000 for registering the mobile unit 102 with a set-top box of the residential environment illustrated in FIG. 9. In step 1002, the mobile unit 102 is placed proximate to the desired set-top box of which the mobile unit 102 is to be registered. In step 1004, a registration procedure is initiated with a set-top box by the mobile unit 102. In step 1006, the mobile unit 102 prompts the user to identify the set to box to which registration is currently desired. In step 1008, the mobile unit 102 scans for wireless signals from wireless network devices that are receivable by the mobile unit 102. In step 1010, the mobile unit 102 determines whether all wireless network devices that are currently receivable have been accumulated. If not, the procedure 1000 returns to step 1008 in which scanning of wireless network devices is continued. If all wireless network devices have been accumulated, the procedure continues to step 1012 in which the measured parameters associated with the wireless signals received from the wireless network devices is sent to the server 112. Examples of measured parameters include MAC addresses, signal strengths, time of reception, derived or implied location of the mobile unit 102, as well as an identification of the mobile unit 102 or a user associated with the mobile unit 102. In step 1014 the server 112 associates the wireless fingerprint generated from the information obtained from the scanned signals from the wireless network devices with the identified set-top box. In step 1016 the database associated with server 112 is updated to include the identifying information associated with the wireless fingerprint.

Figure 11:
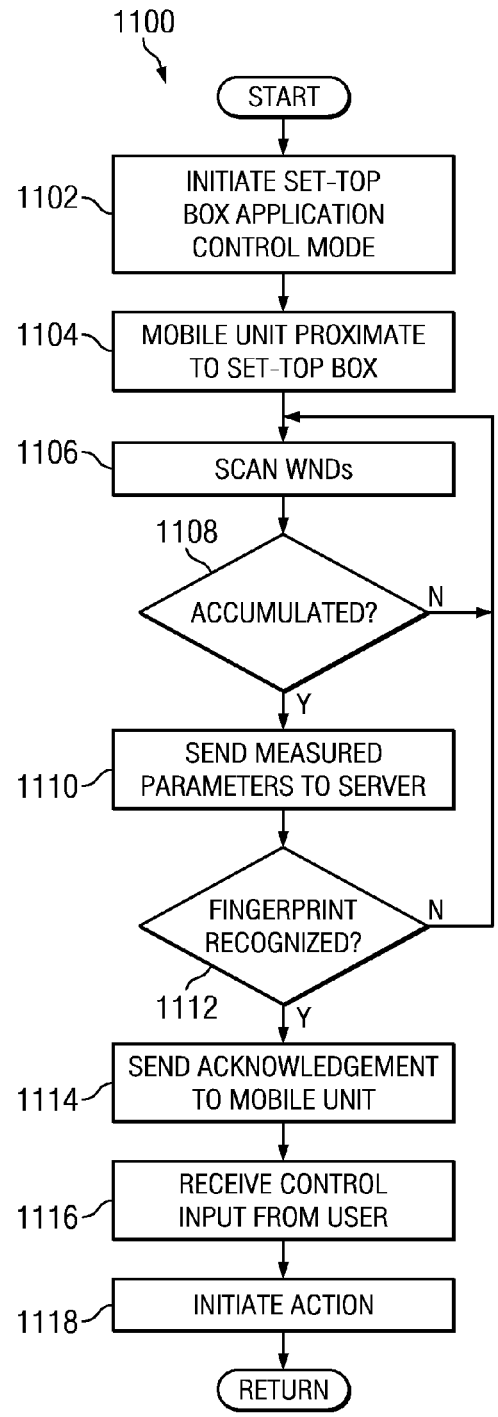
FIG. 11 illustrates an embodiment of a procedure for controlling a registered set-top box using a mobile unit based upon a detected wireless fingerprint.

FIG. 11 illustrates an embodiment of a procedure 1100 for controlling a registered set-top box using a mobile unit 102 based upon a detected wireless fingerprint. In step 1102, the mobile unit 102 initiates a set-top box application control mode of a software application. In one embodiment, the initiation of the set-top box control mode may be performed by a user of the mobile unit 102. In still other embodiments, the initiation of the set-top box application control mode may be formed automatically upon detection of a wireless fingerprint. In step 1104, the mobile unit 102 is placed proximate to the set-top box. In step 1106, the mobile unit 102 scans for wireless signals transmitted by one or more wireless network devices 910a-910e. In step 1108 it is determined whether all of the available wireless signals that are receivable by the mobile unit 102 have been accumulated. If not, the procedure returns to step 1106 in which scanning continues. If the wireless signal have been accumulated, the procedure 1100 continues to step 1110 in which measured parameters associated with each of the received wireless network signals are sent to the server 112. In step 1112, the server 112 determines whether the measured parameters are recognized as matching a wireless fingerprint associated with a registered set-top box. If not, the procedure returns to step 1106 in which scanning continues. If the measured parameters are recognized as matching a wireless fingerprint, the procedure continues to step 1114. In step 1114, the server 112 sends an acknowledgement to the mobile unit 102. In step 1116, the mobile unit 102 receives a control input from a user which includes a command for the set-top box associated with the matched wireless fingerprint to perform a function such as changing a volume, changing a channel, or initiating playback of multimedia. In step 1118, an action is initiated in response to the control input. The procedure then returns to the start.

Figure 12:
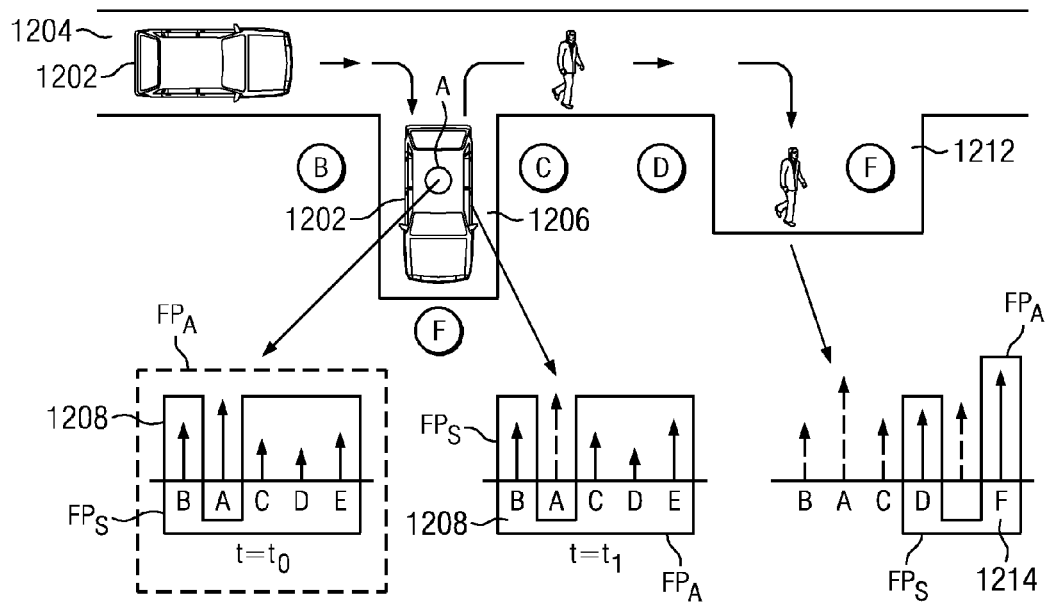
FIG. 12 illustrates a diagrammatic view of one application of the disclosed system.

Referring now to FIG. 12, there is illustrated one application of the presently disclosed system. In one application, there is provided a mobile unit disposed in a car 1202. Car 1202 is mobile on a road 1204 and then moves into a parking space 1206. The parking space 1206 is a location that has associated therewith a fingerprint stored in the system. Of course, if the fingerprint were not previously stored, it could be stored the first time a mobile unit moved within that location. As described hereinabove, the fingerprint is defined by the external wireless devices that are associated with a particular location. In this specific location, there are four external devices, B, C, D and E. Inside the automobile 1202 is provided a wireless device A. This is typically a Bluetooth transceiver that is operable to interface with a mobile unit for voice communication. However, it could be that the mobile unit is not interfaced with the particular Bluetooth in the automobile 1202 but, rather, the mobile unit in the car is merely configured to scan and recognize the presence of the Bluetooth transceiver that was in the automobile 1202.

Thus, when the automobile 1202 is traversing the road 1204, there will be multiple external devices that it may be aware of at any point along the route. However, the mobile device within the car 1202 will always be able to receive the transmission from the Bluetooth within the automobile 1202. It should be understood that Bluetooth devices operate under the 802.11.3 standard, which allows these devices to go to sleep periodically. When the devices are asleep, there will be no received transmission, such that the scanning operation of the mobile unit is not able to receive such at certain times. Periodically, though, the transmission from the Bluetooth device A within the automobile 1202 will be present and is capable of being scanned by the mobile unit.

When the automobile 1202 is present at the location 1206, it will be aware of the presence of the plurality of wireless devices. These will be the wireless devices B, C, D and E in addition to the wireless device A disposed within the automobile 1202. This information can be transmitted to a server (or internally analyzed by the mobile unit) and a fingerprint will be recognized. This fingerprint that is recognized will primarily consist of the four external devices (B-E) and the external device that is in the car (external is defined as external to the mobile device), wherein the primary defining portion of the fingerprint is defined by a box 1208 about the scanned devices, noting that one particular application is external devices separate and apart from the external device in the car. The server will recognize the presence of these four devices and the first indication will be that this comprises the location 1206. It will also recognize that the device A is also present. The algorithm at the server may be such that it recognizes that the device A was previously sensed in prior scans and, as such, it will recognize that this device A is to be filtered when determining what association this fingerprint has to a particular location. Also, the server may recognize that this particular fingerprint is associated with a parking location— the parking location 1206.

When the user stops the car in the parking location and, prior to turning the car off, the first location will be recognized by the fingerprint which is defined at a time $t_0$. At time $t=t_0$, the device A is still present and its signal will be present. However, once the car is turned off, a second scanned fingerprint will exist. This will be at time $t=t_1$. Again, the fingerprint 1208 will be present but the device A will not be present. However, at this point in time, the lack of the device A signal can either mean that the car was turned off or that the Bluetooth device within the automobile 1202 went to sleep. This has to be analyzed, as will be described herein below. Once the user has parked the car and turned the car off, the user then moves to a restaurant or other facility or location 1212. At this location, there is now another fingerprint that will be scanned by the unit. This is illustrated, for exemplary purposes, as having an additional device F disposed thereat. This device will typically be a WiFi device. The fingerprint for this device is illustrated as containing both the device D and the device F, device D being one of the devices that was actually part of the fingerprint 1208 associated with the location 1206 (in this example only due to the proximity to the parking location). This will provide a fingerprint 1214 which is recognized by the server as being at location 1212. In fact, just the presence of the unique device F at location 1212 will indicate to the server that this location constitutes that establishment. There may be other devices that are present as the individual moves around within the establishment that will provide a higher degree of granularity to the fingerprint. However, the dominant device within the fingerprint will be the hot spot device F. The server will recognize the presence of the device F and will recognize that this will define a "group" of fingerprints that could be present or that have been previously recorded. About this dominant device F, a group of fingerprints will be searched to determine that, first, the individual is within the establishment and, second, a relative location within the location. This could also be used, as is described hereinabove, for different a social application to determine if friends are proximate to the user within the establishment, which may be indicated by previously recorded fingerprints. It could be that the fingerprint the establishment 1212 could indicate a particular location therein next to, for example, a television set or such.

Of course, the device A is not present in the scanned fingerprint at that time and, as such, the fingerprint would not be expected to see such and the server will recognize that the individual has walked away from the car. It should be understood that there are two types of fingerprints, there is an actual fingerprint designated as $FP_A$. This is the actual measured fingerprint which represents the signal strength at that time (when the individual is in the car and device A is operating). The signal strengths, as described hereinabove, are a function of the proximity to a particular wireless device, the orientation of the antenna of the mobile device and environmental conditions that might change. There is also designated the stored fingerprint $FP_S$. The box 1208 defines the devices that would be part of the stored fingerprint $FP_S$. At time $t_0$, the illustration shows a stored actual fingerprint. It should be understood that the stored fingerprint corresponds to devices that would be within the scanned actual fingerprint, it being understood that the signal strengths may be different between the stored and the actual although both are illustrated together. This is for simplicity purposes. At time $t_1$, the stored fingerprint and the actual fingerprint are actually the same due to the fact that the device A has disappeared.

In the application illustrated in FIG. 12, what occurs is that there is an awareness or recognition by the server first that the automobile 1202 has been or was present at location 1206. Followed by that, there is an awareness that the device A has disappeared from the fingerprint. The disappearance of this device A is an indication to the application running on the phone that some change has occurred. The server recognizes the actual fingerprint $FP_A$ at time $t_0$. It then recognizes the disappearance of the device A from the fingerprint (it may also be other devices that disappear). Knowing that this device A is the automobile, there is an initial indication that the car has been turned off. However, it is important to ensure that the device A is off and not just asleep. This is facilitated by multiple scans of the fingerprint and, after a predetermined number of scans, if the device A has not reappeared, then the fingerprinted time $t_0$ constitutes the fingerprint defining the location at which the automobile 1202 is disposed at, i.e., when the automobile was turned off. What the server is looking at is a particular fingerprint and disappearance of the device A indicating that the car has been turned off. This is a particular condition precedent associated with the particular application. Whenever the device A disappears, the server initially considers this to be a location where the automobile will be parked. However, the device A must be off for a certain period of time. If it is off, for example, 5 or 10 scans, this is a clear indication that the automobile is in all probability turned off. It will then go back to the last fingerprint at $t_0$ at which the device A was present and use that fingerprint as location at which the device A was turned off. This fingerprint determines the location based upon stored information in the server associated with the specific fingerprint that can be correlated with a map. This allows a "pin" to be dropped onto a map, an action that follows a condition precedent. This concept of "dropping a pin" is one action wherein an indicator is placed onto a map automatically without any intervention of the user. The user or individual then goes to the establishment 1212, and enjoys an evening of dining and frivolity and, as a result of such, may forget where the automobile 1202 has been left. By reviewing the map, the pin that was dropped onto the map will tell the individual where the automobile was parked.

Figure 13:
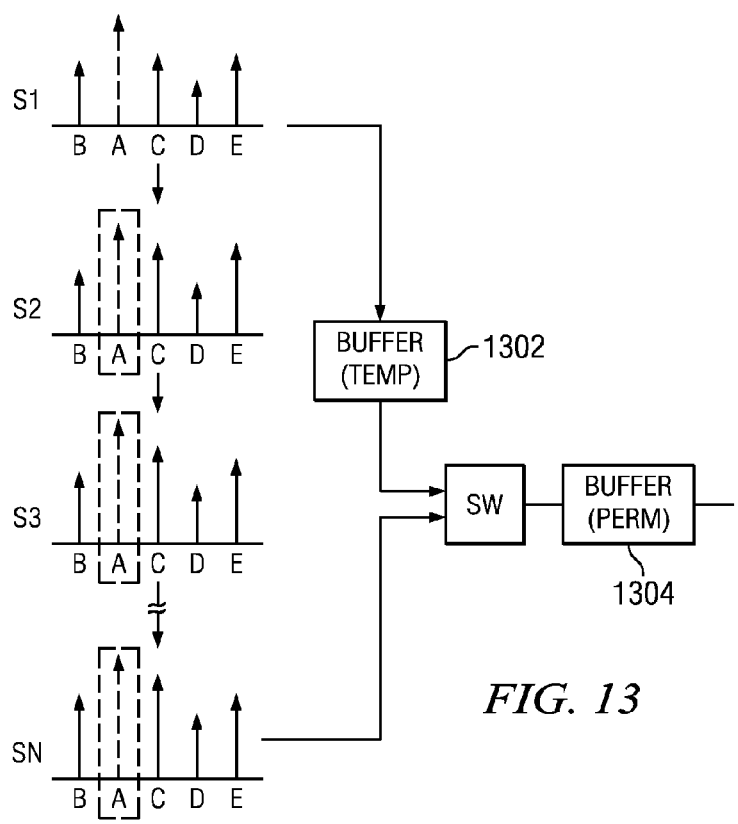
FIG. 13 illustrates a diagrammatic view of the application of FIG. 12.

Referring now to FIG. 13, there is illustrated a diagrammatic view of how the pin is placed onto the map in the current application described. At a fingerprint S1, the device A is recognized as having disappeared from the fingerprint—the condition precedent. Once this device has an indication that it has disappeared, whether it be turned off or it be asleep, this fingerprint is stored in a buffer 1302. This buffer 1302 could be in the mobile device or at the server or other place on the network. Once stored, the next scan, a scan S2 is then performed which could be at the same location, as indicated. This is compared to a previous scan for multiple scans, S2, S3 and so on until scan SN. Scan SN this being 5 or 10 scans later, if the device is continuously not there for either the reason that it is turned off or for the reason that the user has taken a mobile unit out of the transmission range of the device A, there will be a switch of information in the buffer 1302, this being the fingerprint at the first scan, S1, and this will be then be placed in a permanent buffer 1304. The indication in the diagram of FIG. 13 is essentially the same for all scans. However, this will only be the case if the user were sitting in the car 1202. The fingerprint could change with respect to other devices that are scanned. However, what is important is that the device A is sensed as not being present for all of the scans and then selecting back in time the fingerprint at which the device A first disappeared.

In the application, what occurs is that fingerprints are buffered for whatever purpose. It could be that fingerprints are buffered and there is a technique wherein it is recognized that an individual has now entered the establishment just because, for example, the device F is recognized. By recognizing device F, the application could be configured such that it makes a decision the individual with the mobile unit is out of their automobile. It would then search backwards in the fingerprints to the last location where device A was determined as being present. It will then associate automobile 1202 with that location and drop a pin on a map. The pin is dropped as a result of recognizing the individual being in an establishment and then the system would go back in the buffer to determine the last place that the device A was present. As such, an action has been taken based upon the lack of a device or the disappearance of a device from a fingerprint or the presence of what is recognized as being a stable and permanently located device within a group of fingerprints.

Figure 14:
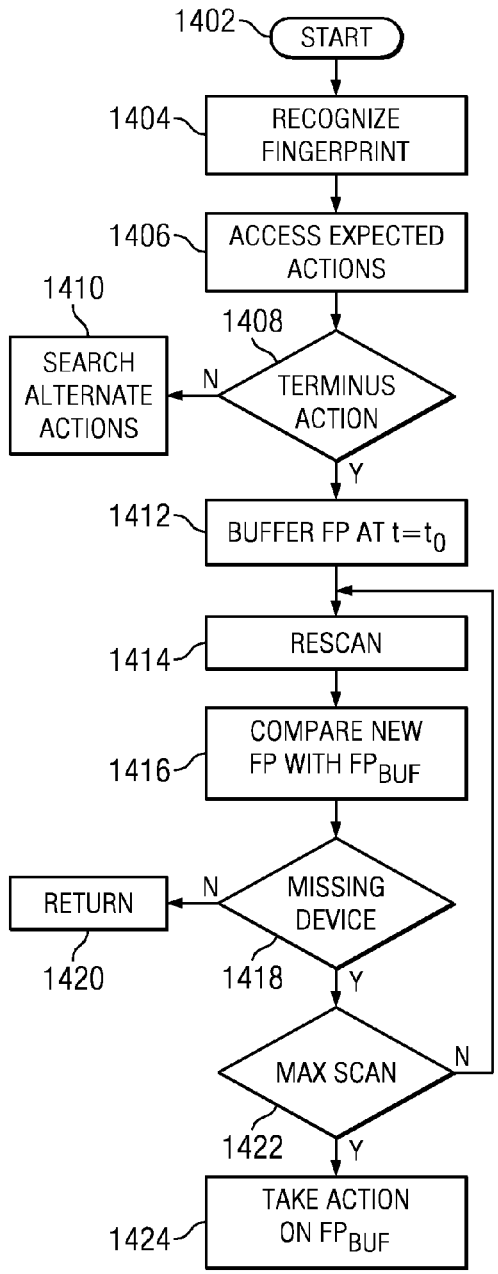
FIG. 14 illustrates a flow chart for the operation of the application in FIG. 12.

Referring now to FIG. 14, there is illustrated a flow chart depicting the operation of the embodiments of FIGS. 12 and 13, which is initiated at a start block 1402 and then proceeds to function block 1404 to recognize the fingerprint with a scan. This is the actual fingerprint that is scanned and then compared with the database to determine if, for example, the automobile 1202 is at location 1206. Once this is recognized, the program then flows to a function block 1406 to access expected actions. One expected action, for example, is a terminus action. This terminus action is an action that, knowing that the automobile 1206 is at a parking location (this is recognized as a parking location because of the user previous entering such information or recognizing that mobile units with mobile device IDs had previously come there) and this action is possibly the action that is chosen. After the expected actions are accessed, the program flows to a decision block 1408 to determine if the terminus action is one that is taken. If not, the program flows along an "N" path to function block 1410 to search for other alternative actions. If, however, the terminus action is the one that is selected and is associated with the application running on the phone or mobile device and the program flows along the "Y" path to function block 1412 to buffer the actual fingerprint at time, $t_0$. The program then flows to function block 1414 to rescan the external devices and then to a function block 1416 to compare the new fingerprint with the buffered fingerprint and then to a decision block 1418 to determine if there is a missing device from the fingerprint. If not, then the system clears the buffer and it flows along an "N" path to a block 1420 to return to the scanning operation. However, if the device is missing from the fingerprint in the buffer, the program flows to a decision block 1422 to determine if the maximum number of scans has been reached. If not, the program flows along an "N" path back to the function block 1414 and the scan number is incremented in order to rescan the system. This occurs for the maximum number of scan, at which time the program flows from the decision block 1420 to a "Y" path to a function block 1424 to take an action based upon the fingerprints stored in the buffer. This is the $FP_{buf}$. This action, as described hereinabove, could be placing a pin on the map indicating the last location at which the particular missing device were present.

Figure 15:
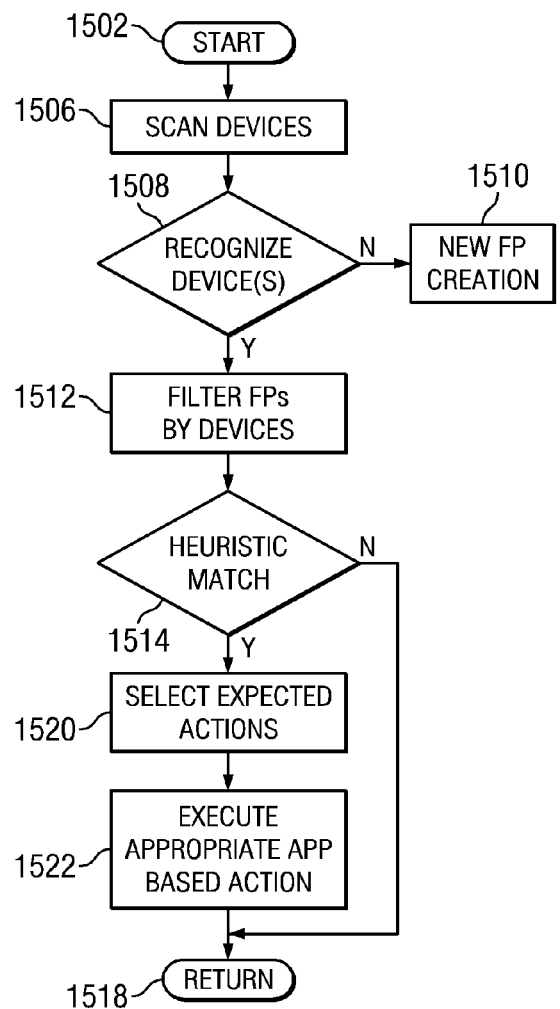
FIG. 15 illustrates a flow chart for scanning the devices by a mobile unit.

Referring now to FIG. 15, there is illustrated a flow chart depicting the operation of scanning, which is initiated at a block 1502. The program flows to function block 1506 to scan the devices and then to a decision block 1508 to recognize which devices are in the scan. As described hereinabove, there are certain devices such as the device F in FIG. 12 that are dominant devices or fixed devices. By recognizing all the devices, there may be one device that is a device that frequently occurs within the database. This device will provide an index to a group of fingerprints. If none of the devices are recognized, however, this would indicate that there must be a new fingerprint creation, which is indicated by flow to a function block 1510. However, once the devices are recognized, this indicates that there are fingerprints in the database associated therewith. The program flows to function block 1512 in order to filter these fingerprints by the devices. There may be some devices that are recognized as being mobile appearing in multiple different locations and other devices that are recognized as being substantially fixed, i.e., for the most part they are at a fixed location. This could be a situation where, for example, a WiFi device was disposed at one location such as a home and then, at a later time, when an individual has moved, the device is moved to a different location. For the most part, it is disposed at a common location which will be indicated by a mobile device transmitting information to the server along with its location information.

Once the fingerprints have been filtered, there are less fingerprints to deal with and, utilizing the heuristic algorithms, there is determination made as to whether there is a match based on this algorithms, as set forth in a decision block 1514. If not, the program flows along an "N" to a return block 1518. However, if there is a match, this indicates that there is a fingerprint within the system that is associated with the actual scanned fingerprint. The program then flows along a "Y" path to a function block 1520 in order to select the expected actions associated with that particular fingerprint. In this system, there may be many different actions that could be associated with a fingerprint, such as placing a pin on a map, bringing up locations of friends that are in proximity to the mobile unit, turning on external devices in response to the fingerprint, turning on lights, set top boxes. These actions all could be possible with respect to the fingerprint. The program then flows to a function block 1522 in order to execute the appropriate application based action.

The actions, as described hereinabove, can be multiple actions. They can be such things as changing the setting on a particular mobile unit or phone, change routing information on a phone. This could be a situation where individuals with their phone or mobile unit enters their apartment and the routing is automatically changed by the communications server at a provider as a result of recognizing to the mobile unit the presence or awareness of devices that constitute part of the fingerprint. A call could be initiated or any type or communication could be initiated based upon the awareness of a certain fingerprint. A phone display could be changed such as when an individual walks into a store and splash page is changed indicating the presence of coupons or advertising and the such. Further, some settings on the phone could be changed.

He actions taken may be taken in a number of ways. In one instantiation, a phone or mobile device may take a fingerprint and send it to the server and the server return a match to that phone and the phone can then do a lookup in the local phone database for any stored action that may be associated with that match. Just a match of any type may elicit an action. In another instantiation, the server can see the fingerprint, compare it with the server database store and determine from the "closest" matching fingerprint one or more actions that are associated with that fingerprint. The server can either return the one or more actions to be taken to the phone and the phone determine what of the returned actions to take or the server can select the action to be taken and send the action to the phone and the phone then either be controlled to take the action or have the option of taking the action. The server can also instruct another local device to take an action or even instruct a remote device to take some type of action. The server can also instruct another phone that is in the same vicinity to take an action. This may require the second phone to also see the same fingerprint so that the server has some degree of confidence that the second phone is in the same vicinity. As such, the phone can determine its destiny or it can be controlled by the server such that the developer can determine actions to be taken that are a function of the fingerprint. These actions may be parameterized by other aspects, such as which phone had seen the fingerprint, some action that preceded this fingerprint capture, etc.

It will be appreciated by those skilled in the art having the benefit of this disclosure that this phone system provides a system that scans the environment about a mobile personal data device to determine the presence of other transmitting devices with identifiers embedded in their transmissions. A fingerprint of these devices is made and stored at a server for later use in a comparison operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for providing control in a given environment about a given mobile unit operated by a user, which environment includes one or more broadcast units for broadcasting information that includes one or more attributes associated with the operation of each of the broadcast units in the given environment, comprising the steps of:

receiving at the given mobile unit broadcast information from at least one of the one or more of the broadcast units;

providing a database of fingerprints at a remote node on a network, each fingerprint comprising a representation of the received attributes of broadcast units within the given environment or other environment in which the given mobile unit or other mobile units was previously present and had received broadcast information from any broadcast units for recording thereof in the database;

transmitting the received broadcast information to the remote node;

comparing at the remote node the attributes associated with the received broadcast information from the at least one or more broadcast units within the given environment with the stored fingerprints;

determining at the remote node if the attributes associated with the received broadcast information from the one or more broadcast units within the given environment match any of the stored fingerprints;

providing a stored set of predetermined actions at the remote node related to one or more of the stored fingerprints which such actions represent an action that a previous user had associated with being in the presence of the associated broadcast units;

selecting at the remote node a related one or more of the actions in response to the step of determining a match to the attributes of the one or more broadcast units within the given environment;

if a match was not determined, the allowing user of the given mobile unit to associate one of the predetermined stored set of actions with the unmatched fingerprint as the selected action; and executing the selected action.

2. The method of claim 1, wherein the attributes associated with the received broadcast information from the one or more broadcast units within the given environment are selected from the group that consists of RF energy levels of the received signal, a friendly ID of the received signal, the MAC address comprising the physical address of a physical device that comprises the broadcast unit and a geographical location of the broadcast unit.

3. The method of claim 1, wherein the fingerprint varies as a function of the physical proximity of the given mobile unit to at least one of the one or more of the broadcast units, and wherein each of the at least one of the one or more of the broadcast units have attributes that differ as a function of physical proximity to the given mobile unit.

4. The method of claim 1, wherein the step of determining requires that the match operation only substantially match stored fingerprint information with attributes associated with the received broadcast information from one or more broadcast units within the given environment within a predetermined range.

5. The method of claim 4, wherein the step of determining utilizes a predetermined matching algorithm to determine if a match occurred.

6. The method of claim 1, wherein the step of executing the action comprises modifying the operation of the given mobile unit.

7. The method of claim 1, wherein the step of executing the action comprises modifying some aspect of the environment surrounding the given mobile unit.

8. The method of claim 7, wherein modifying some aspect of the environment surrounding the given mobile unit is controlled by a server and not by the given mobile unit.

9. The method of claim 1, wherein the fingerprint represents the state of any mobile unit within the associated environment at a particular physical location therein.

10. The method of claim 1, wherein the step of selecting the action is independent of any interaction by a user of the given mobile unit.

11. The method of claim 1, wherein the action is performed on the given mobile unit.

12. The method of claim 1, wherein one of the other mobile units in the given environment receives substantially the same broadcast information so that the steps of comparing and determining relative to such other mobile unit results in a match to the same stored fingerprint as the given mobile unit and the step of executing the selected action results in executing the action relative to the other of the mobile units.

13. The method of claim 1, wherein a fingerprint associated with more than one of the broadcast units upon user creation can be modified by the user to eliminate at least one of the associated broadcast units from the fingerprint.

14. A method for providing control in a given environment about a given mobile unit operated by a user, which environment includes one or more broadcast units for broadcasting information that includes one or more attributes associated with the operation of each of the broadcast units in the given environment, comprising the steps of:

providing a database of fingerprints at a remote node on a network, each fingerprint comprising a representation of the received attributes of broadcast units external to the given mobile unit within the given environment or other environment in which the given mobile unit or other mobile units was previously present and had received broadcast information from any broadcast units in the presence of such given mobile unit or the mobile unit for recording thereof in the database;

capturing at the given mobile unit broadcast information from at least one of the one or more of the broadcast units external to the given mobile unit representing a captured fingerprint;

transmitting the captured attributes to the remote node and converting such to a captured fingerprint;

comparing the attributes associated with the captured fingerprint with the stored fingerprints;

determining at the remote node if the attributes associated with the received broadcast information from the one or more broadcast units within the given environment converted into the captured fingerprint match any of the stored fingerprints;

providing, at the remote node, a stored set of user associated predetermined actions related to one or more of the stored fingerprints;

selecting, as a selected action, a related one or more of the actions in response to the step of determining a best match to the captured fingerprint if such match exists and, if such match does not exist, creating with user input from the given mobile unit a new user defined association to the captured fingerprint as the selected action; and executing the selected action.

* * * * *